US011972633B2

(12) United States Patent
Soltz

(10) Patent No.: US 11,972,633 B2
(45) Date of Patent: Apr. 30, 2024

(54) NOTIFICATION SYSTEMS AND METHODS FOR NOTIFYING USERS BASED ON FACE MATCH

(71) Applicant: Mark Soltz, Yardley, PA (US)

(72) Inventor: Mark Soltz, Yardley, PA (US)

(*) Notice: Subject to any disclaimer, the term of this patent is extended or adjusted under 35 U.S.C. 154(b) by 0 days.

(21) Appl. No.: 18/205,160

(22) Filed: Jun. 2, 2023

(65) Prior Publication Data
US 2024/0005697 A1 Jan. 4, 2024

Related U.S. Application Data

(62) Division of application No. 17/854,476, filed on Jun. 30, 2022.

(51) Int. Cl.
*G06T 17/20* (2006.01)
*G06V 40/16* (2022.01)

(52) U.S. Cl.
CPC .......... *G06V 40/161* (2022.01); *G06T 17/205* (2013.01); *G06V 40/179* (2022.01); *G06V 2201/10* (2022.01)

(58) Field of Classification Search
CPC ... G06V 40/161; G06V 40/179; G06T 17/205
See application file for complete search history.

(56) References Cited

U.S. PATENT DOCUMENTS

| 10,019,774 B2 | 7/2018 | Leonard et al. |
| 10,304,234 B2 | 5/2019 | Hellam et al. |
| 10,740,804 B2 | 8/2020 | Spivack et al. |
| 10,825,246 B2 | 11/2020 | Lukau et al. |
| 10,853,398 B2 | 12/2020 | Fisher |

(Continued)

FOREIGN PATENT DOCUMENTS

| KR | 20170058025 A | 5/2017 |
| TW | 202121286 A | 6/2021 |
| WO | 2020021319 A1 | 1/2020 |

OTHER PUBLICATIONS

Palmer, J., "From Numbers to Names Artificial intelligence program can identify Holocaust photos" Jewish Standard (Jul. 20, 2022), pp. 1-4, https://jewishstandard.timesofisrael.com/from-numbers-to-names/.

(Continued)

*Primary Examiner* — Sam Bhattacharya
(74) *Attorney, Agent, or Firm* — Carter, DeLuca & Farrell, LLP; George Likourezos

(57) ABSTRACT

A notification system notifies users when there is a match between images. The notification system includes a network interface receiving images from a plurality of user devices including a first user device and a second user device, a memory storing database and instructions, and a processor. The processor executes the instructions to function as an image processing unit processing the received images, a face recognition unit recognizing one or more faces in each received image, a face matching unit checking whether a face in a first image from the first user device matches a face in a second image from the second user device, a metadata processing unit processing metadata in each received image, and a notification unit notifying the first user device and the second user device in a case where the face in the first image matches the face in the second image.

20 Claims, 10 Drawing Sheets

(56) References Cited

U.S. PATENT DOCUMENTS

| | | | |
|---|---|---|---|
| 10,922,049 | B2 | 2/2021 | Bolden |
| 10,977,871 | B2 | 4/2021 | Delia et al. |
| 2013/0125029 | A1* | 5/2013 | Miller .................. G06F 9/45529 |
| | | | 715/760 |
| 2013/0346068 | A1 | 12/2013 | Solem et al. |
| 2018/0157900 | A1 | 6/2018 | Ganong et al. |
| 2020/0042160 | A1 | 2/2020 | Gabbi et al. |
| 2021/0233326 | A1* | 7/2021 | Li ........................... G06T 7/593 |
| 2022/0114126 | A1* | 4/2022 | Nelson .................. G06F 1/1683 |
| 2022/0277489 | A1* | 9/2022 | Ali ........................... G06N 3/08 |
| 2023/0048044 | A1* | 2/2023 | Liu ........................ B60Q 1/508 |

OTHER PUBLICATIONS

Schwartz, Y., "Google engineer identifies anonymous faces in WWII photos with AI facial recognition" The Times of Israel (Jun. 26, 2022) pp. 1-5, https://www.timesofisrael.com/google-engineer-identifies-anonymous-faces-in-wwii-photos-with-ai-facial-recognition/.

Gerken, T., "AI reunites Holocaust survivor with childhood photos" BBC News (Nov. 12, 2022) pp. 1-13, https://www.bbc.com/news/technology-63483694.

Numbers to Names "Discover Loved Ones and Relatives Lost in the Holocaust" (Jun. 2022) https://numberstonames.org/priv.html.

International Search Report and Written Opinion issued by ISA/US in connection with International Application No. PCT/US23/26676, dated Nov. 7, 2023.

\* cited by examiner

NOTIFICATION SYSTEMS AND METHODS FOR NOTIFYING USERS BASED ON FACE MATCH

CROSS-REFERENCE TO RELATED APPLICATION

The present application is a divisional of U.S. patent application Ser. No. 17/854,476, filed Jun. 30, 2022, the entire contents of which are hereby incorporated herein by reference.

FIELD

The present disclosure relates to notification systems and methods for notifying users based on face match, and more particularly, for notifying users based on face match in digital image files.

BACKGROUND

Pictures capturing people, who have passed away or are still alive, have been kept in analog form (e.g., pictures developed on a paper or in negative films) or in digital storages in digital forms (e.g., digital images having extension of jpg, jpeg, bmp, tiff, gif, png, esp, raw, psd, xcf, ai, cdr, etc.). Such pictures can remind the picture holders of the people captured in the pictures. When the same pictures are shared with family members or friends, the picture holders, however, are unable to connect to each other based on the same pictures when they live apart from each other. Further, pictures on paper generally do not have any written information and digital form of the pictures on paper generally do not include metadata about the pictures on paper.

Further, pictures in analog or digital form are inherently two dimensional and cannot provide three-dimensional information with information contained therein.

SUMMARY

Images uploaded from users may include one or more same faces, meaning that the users are related as relatives or friends. Thus, by identifying faces in the uploaded images and comparing faces in the uploaded images, users are able to connect to other users when there are one or more matched faces. Further, by generating a three-dimensional virtual representation of images, users may be able to experience environments depicted in images and communicate with persons depicted in the images.

In accordance with aspects of the present disclosure, a notification system notifies users when there is a match between images. The notification system includes a network interface receiving images from a plurality of user devices including a first user device and a second user device, a memory storing database and instructions, and a processor. The processor executes the instructions to function as an image processing unit processing the received images, a face recognition unit recognizing one or more faces in each received image, a face matching unit checking whether a face in a first image from the first user device matches a face in a second image from the second user device, a metadata processing unit processing metadata in each received image, and a notification unit notifying the first user device and the second user device in a case where the face in the first image matches the face in the second image.

In aspects, the processor further executes the instructions to function as a relationship unit configured to relate a face with corresponding metadata.

In aspects, in a case where a received image does not have metadata therein, the metadata processing unit is further configured to send a request for metadata to a corresponding user device and receive metadata from the corresponding user device.

In aspects, the face recognition unit is further configured to group same faces in the received images from each user device and set a representative face of the same faces. The face matching unit is further configured to calculate a difference between a first representative face in received images from the first user device and a second representative face in received images from the second user device. In a case where the difference is between a first threshold and a second threshold, the face matching unit is further configured to calculate a similarity score between the metadata of the first representative face and the second representative face. In a case where the similarity score is greater than or equal to a third threshold, the notification unit notifies the first and second user devices.

In aspects, the metadata includes personal information, geographical information, and image information.

In aspects, the database includes user information of each user. The first and second user devices are notified based on the user information.

In accordance with aspects of the present disclosure, a notification method notifies users when there is a match between images. The notification method includes receiving images from a plurality of user devices including a first user device and a second user device, processing the received images, recognizing one or more faces in each processed image, checking whether a face in a first image from the first user device matches a face in a second image from the second user device, processing metadata in each received image, and notifying the first user device and the second user device in a case where the face in the first image matches the face in the second image.

In aspects, the notification method further includes relating a face with corresponding metadata.

In aspects, the notification method further includes, in a case where a received image does not have metadata therein, sending a request for metadata to a corresponding user device and receiving metadata from the corresponding user device.

In aspects, face matching is checked by grouping same faces in the received images from each user device and setting a representative face of the same faces. The face matching is further checked by calculating a difference between a first representative face in received images from the first user device and a second representative face in received images from the second user device. In a case where the difference is between a first threshold and a second threshold, the face matching is checked by calculating a similarity score between the metadata of the first representative face and the second representative face. In a case where the similarity score is greater than or equal to a third threshold, the first and second user devices are notified.

In aspects, the notification method further includes storing a database, which includes user information of each user. The first and second user devices are notified based on the user information.

In accordance with aspects of the present disclosure, a non-transitory computer readable storage medium includes instructions that, when executed by a computer, cause the computer to perform a notification method for notifying users when there is a match between images. The notification method includes receiving images from a plurality of user devices including a first user device and a second user device, processing the received images, recognizing one or more faces in each processed image, checking whether a face in a first image from the first user device matches a face in a second image from the second user device, processing metadata in each received image, and notifying the first user device and the second user device in a case where the face in the first image matches the face in the second image.

In accordance with aspects of the present disclosure, a virtual reality system creates a virtual three-dimensional (3D) representation of an image. The virtual reality system includes a processor, a memory coupled to the processor and storing one or more instructions. The instructions, when executed by the processor, cause the virtual reality system to function as an access unit configured to access a first image from a database, the first image input into the database by a user, a virtual 3D generation unit configured to perform image processing on the first image to detect at least one object depicted in the first image and to generate a virtual 3D representation of the at least one object, a receiving unit configured to receive, via a user interface, a command for modification, and a modification unit configured to modify the virtual 3D representation based on the command.

In aspects, the virtual 3D generation unit is further configured to generate a 3D mesh of the at least one object. The virtual 3D generation unit employs an artificial intelligence module to detect at least one of edges, nodes, and faces of the at least one object to generate a plurality of features of the 3D mesh. The command includes an audio command. The instructions, when executed by the processor, further cause the virtual reality system to function as a language processing unit configured to parse the audio command to identify a feature of the plurality of features of the virtual 3D representation expressed in the audio command. The modification unit modifies the identified feature of the plurality of features of the virtual 3D representation according to the audio command.

In aspects, the audio command is for identifying a new object or feature, and the modification unit adds the new feature or object expressed in the audio command to the virtual 3D representation.

In aspects, the instructions, when executed by the processor, further cause the virtual reality system to function as an animating unit configured to, when the at least one object includes a human, animate the human to speak or move in the virtual 3D representation.

In aspects, the access unit is further configured to access a second image from the database, the second image input into the database by another user and related to the first image. The virtual 3D generation unit is further configured to process the second image to detect at least one object depicted in the second image and determine at least one difference depicted in the second image between the at least one object in the first image and the second image, and the modification unit is further configured to modify the virtual 3D representation of the at least one object based on the difference.

In accordance with aspects of the present disclosure, a method creates a virtual three-dimensional (3D) representation of an image. The method includes accessing a first image from a database, the first image input into the database by a user, processing the first image to detect at least one object depicted in the first image, and generating a virtual 3D representation of the at least one object. The method also includes receiving, via a user interface, a command to modify the virtual 3D representation, and modifying the virtual 3D representation based on the command.

In aspects, generating the 3D virtual representation includes generating a 3D mesh of the at least one object. Generating a 3D mesh of the at least one object includes detecting at least one of edges, nodes, or faces of the at least one object to generate a plurality of features of the 3D mesh using an artificial intelligence.

In aspects, the command includes an audio command, and the method further includes parsing the audio command to identify a feature of the plurality of features of the virtual 3D representation or to identify a new feature to be added to the virtual 3D representation expressed in the audio command. Modifying the virtual 3D representation includes modifying the identified feature of the plurality of features of the virtual 3D representation or adding the new feature to the virtual 3D representation according to the audio command.

In aspects, the method further includes, when the at least one object includes a human, animating the human to speak or move in the virtual 3D representation.

In aspects, the virtual 3D representation of the at least one object is modified based on the difference.

In accordance with aspects of the present disclosure, a non-transitory computer readable storage medium includes instructions that, when executed by a computer, cause the computer to perform a method for creating a virtual three-dimensional (3D) representation of an image. The method includes accessing a first image from a database, the first image input into the database by a user, processing the first image to detect at least one object depicted in the first image, and generating a virtual 3D representation of the at least one object. The method also includes receiving, via a user interface, a command to modify the virtual 3D representation, and modifying the virtual 3D representation based on the command.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

Various aspects and features of the present disclosure are described hereinbelow with reference to the drawings wherein like numerals designate identical or corresponding elements in each of the several views.

DETAILED DESCRIPTION

Provided in this disclosure are notification systems and methods for providing a notification to two or more users when their pictures include the same face so that related families or friends can be connected to each other. For example, when one or more images, which have been shared by users, include family members or friends, it is likely that the users are close or distant family members, or friends. However, the holders of the images are incapable of connecting to each other based on mere possession of the images. Based on the notification sent to users by the present notification system, they are able to connect to each other.

Further, provided in this disclosure are virtual reality (VR) systems and methods for providing a VR space for the related families or friends to be connected to each other in the VR space. When a person captured in the images has passed away, the holders of the image are unable to meet or communicate with the person based on mere possession of the images. However, the VR systems may provide functionalities so that the users of the image are capable of meeting and communicating with even deceased family members or friends.

In this disclosure, "image" or "images" are used to represent digital images unless otherwise identified, and "virtual reality" ("VR") is used to include virtual reality, augmented reality, and mixed reality. Based on the notification, users can meet and communicate each other in a VR space. The terms "system," "server," "computer," and "user device" refer to a computing device, which is able to perform arithmetic and logical computations. The term "a," "an," and "one" may be used to mean one or more.

Figure 1:
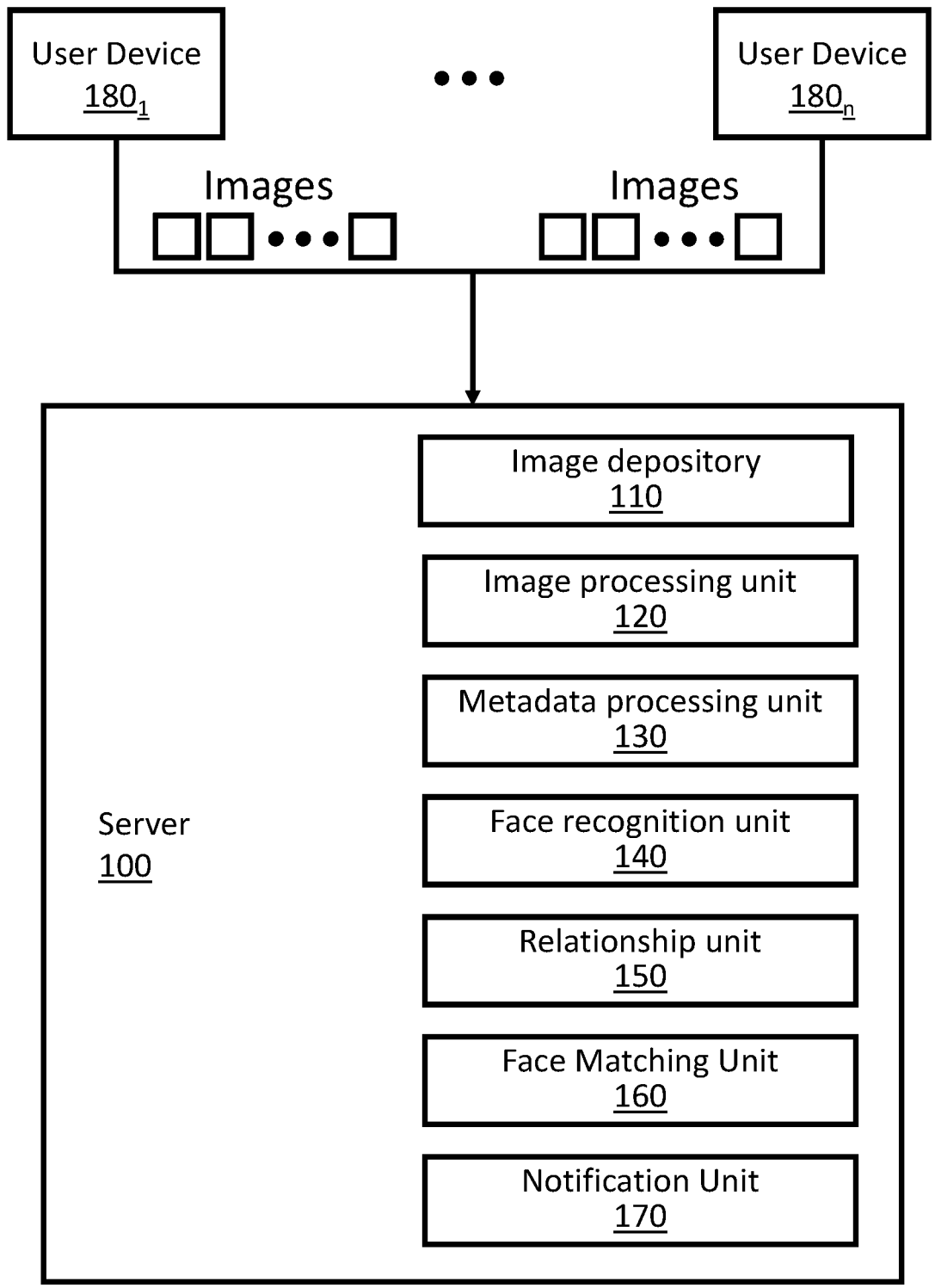
FIG. 1 is a block diagram for a notification system in accordance with aspects of the present disclosure.

Provided in FIG. 1 is a notification server 100 according to aspects of the present disclosure. The notification server 100 sends a notification to both users when one or more images of each user include a same face or person. By providing the notification to the users, they can connect to each other via the same face or person in the images. In this regard, the notification server 100 receives images from a plurality of users via a plurality of user devices $180_1$-$180_n$, or the plurality of users upload images to an image depository 110 of the notification server 100. The image depository 110 may be an internal or external storage medium or a storage medium in a cloud.

The notification server 100 includes an image processing unit 120, which processes the images stored in the image depository 110. The image processing unit 120 may resize the stored images so that every resized image has the same resolution. The image processing unit 120 may also adjust brightness of the stored images so that the resulted images have similar brightness. Further, the image processing unit 120 may process the stored images to differentiate the foreground from the background. In this way, the image processing unit 120 may perform pre-processing of the stored images to be ready for functions of a face recognition unit 140. In an aspect, the pre-processed images may be stored in the image depository 110. In another aspect, the image depository 110 may have a first storage for storing received/uploaded images from the plurality of users via the user devices $180_1$-$180_n$ and a second storage for storing pre-processed images.

The notification server 100 further includes a metadata processing unit 130, which is able to extract metadata from the images, which are stored in the image depository 110 in digital format, of which extension may include jpg, jpeg, bmp, tiff, gif, png, esp, raw, psd, xcf, ai, cdr, etc. This list of extensions is not exhaustive but is provided as examples. Generally, the images in digital format include metadata, which is information about, for example, geolocation and settings such as aperture, shutter speed, ISO number, focal depth, and dots per inch (DPI). The metadata processing unit 130 extracts such metadata.

In an aspect, the metadata processing unit 130 may add metadata to the stored images. For example, in a case where images are originally in analog format (e.g., paper pictures or negative films) and digitized by a scanner or an image capturing device later, the digitized images may not include metadata or, even when the digitized images include metadata, the geolocation information in the metadata contained in the digitized images may not be the geolocation where the original pictures were captured. In another case where paper pictures are captured or digitized by an image capturing device, the geolocation of the captured images may not be the geolocation of the original pictures. In these cases, the metadata processing unit 130 may provide a user interface requesting a user to enter relevant information of the original pictures in analog format. For example, the relevant information may be geolocation information of the original picture, which is in analog format.

After the metadata processing unit 130 extracts or adds the metadata, the face recognition unit 140 performs face recognition processing over the digital images pre-processed by the image processing unit 120. Specifically, the face recognition unit 140 sets regions for faces shown in the images and extracts features of the faces. For example, with reference to FIG. 2, an image 200 includes two sections: a metadata section 210 and an image section 220. The image section 220 includes two persons in the foreground. The metadata processing unit 130 extracts the metadata from the metadata section 210 and the face recognition unit 140 sets a region 230 for each face and recognizes the faces by extracting features from each face.

In an aspect, the metadata processing unit 130 may add holder information of the holder of the image to the metadata. The holder information may include the name and contact information (e.g., address, phone number, email address, etc.) of the holder, who uploads the image. The holder information may further include a permission flag, which allows the notification server 100 to contact the holder when a matching face is found in an image uploaded by another holder.

The metadata processing unit 130 may add time information indicating the capturing time of the image. The time information may be automatically added when the image is captured or manually added when the paper image is digitally scanned.

In an aspect, the face recognition unit 140 may utilize machine learning systems and machine learning algorithms in recognizing faces in images. In aspects, the machine learning systems and machine learning algorithms may be trained via a supervised or unsupervised manner. For example, previously captured images may be provided with annotations of face regions and faces therewithin and train the machine learning system and machine learning algorithms by reinforcing weights. The machine learning systems may include, but are not limited to, neural networks, deep neural networks, recurrent neural networks (RNN), deep learning through neural networks, generative adversarial networks (GAN), Bayesian Regression, Naive Bayes, Monte Carlo Methods, nearest neighbors, least squares, means, and support vector regression, long short-term memory (LSTM), among other data science, artificial intelligence, and machine learning techniques.

Figure 2:
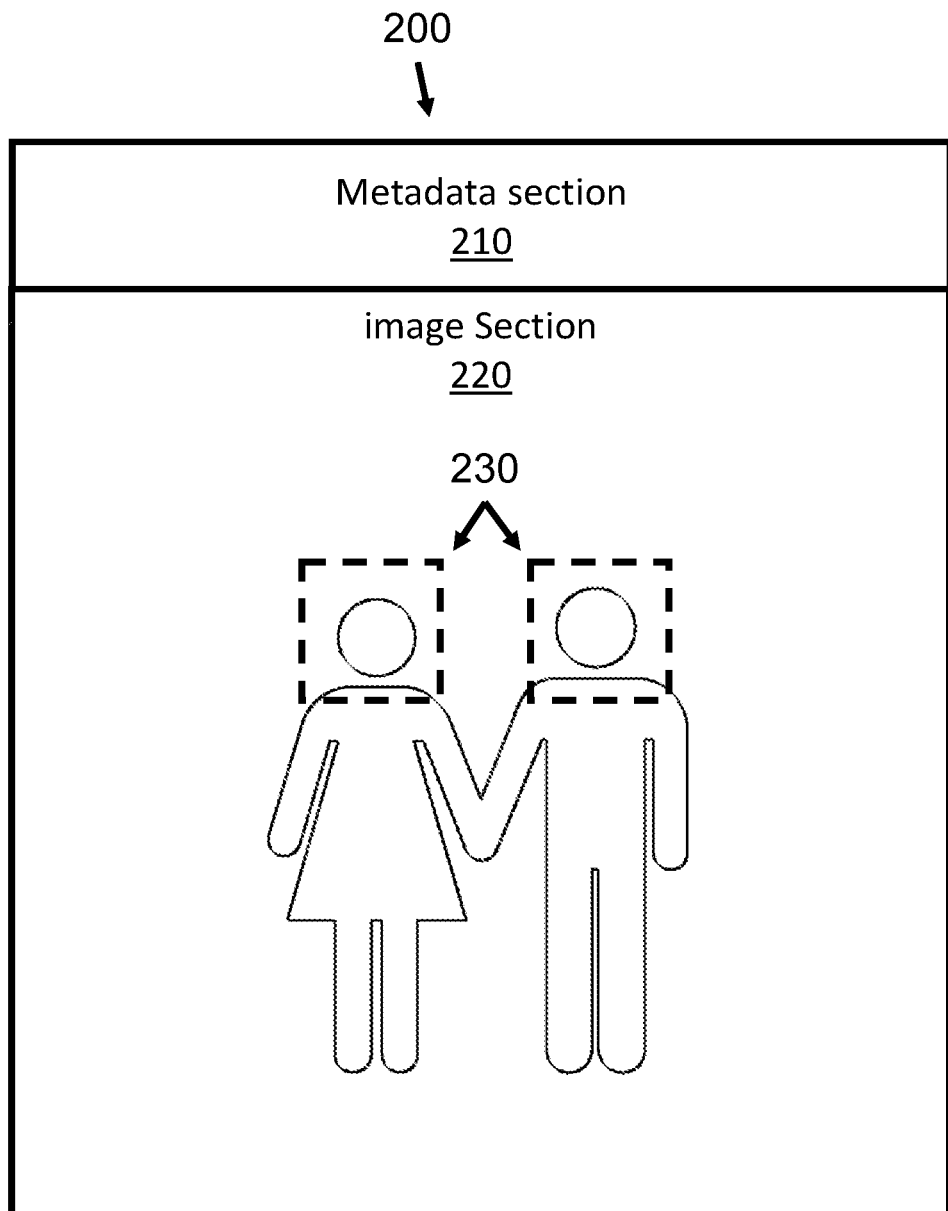
FIG. 2 is a graphical illustration of digital image structure saved in a notification system in accordance with aspects of the present disclosure.

After recognizing the faces in the image, the metadata processing unit 130 may receive face information, which is specific for each recognized face from the user. For example, the face information may include recognized person's name, sex, parents' names, siblings' names, date of birth, birthplace, spouse's name, names of children, date of death, burial place, etc. Thus, when one image includes two persons as shown in FIG. 2, the user may provide respective face information for each recognized face.

In another aspect, the metadata of the image 200, which is stored in the metadata section 210, may be inherited to the face information of each recognized face in the image 200. The personal information for each recognized face may be added to the face information by the user.

Now referring back to FIG. 1, the notification server 100 includes a relationship unit 150, which relates each recognized face to the corresponding metadata and face information. In an aspect, the relationship unit 150 may build a database by storing relationship between each recognized face and the corresponding metadata and face information. The database also stores the original images and the images of the faces in the original images and their relationship therebetween. The database may be stored for each user. In this way, the users may have their own database of friends, coworkers, family members, relatives, acquaintances, etc. In an aspect, the database may be a relational database, NoSQL database, cloud database, key-value database, hierarchical database, or any other appropriate database.

After processing all the images uploaded by one user and recognizing all faces in each image, there may be one or more same faces in the database of the user. In this case, the relationship unit 150 may group the same faces as one group and set a representative face, which represents the group of the same faces. Same faces may refer to faces of a person, which have been captured in different directions or show different facial expressions. The representative face may show the whole face of the person in a substantially forward-facing position among the group of the same faces. The database may hierarchically store the same faces under the representative face.

In an aspect, since people's faces age along the passage of time, the machine learning algorithm may manipulate and perform morphological processing so that faces in images can be changed to faces at a reference age (e.g., 20s, 30s, 40s, etc.). By doing so, the representative faces may represent faces at the reference age.

Figure 3:
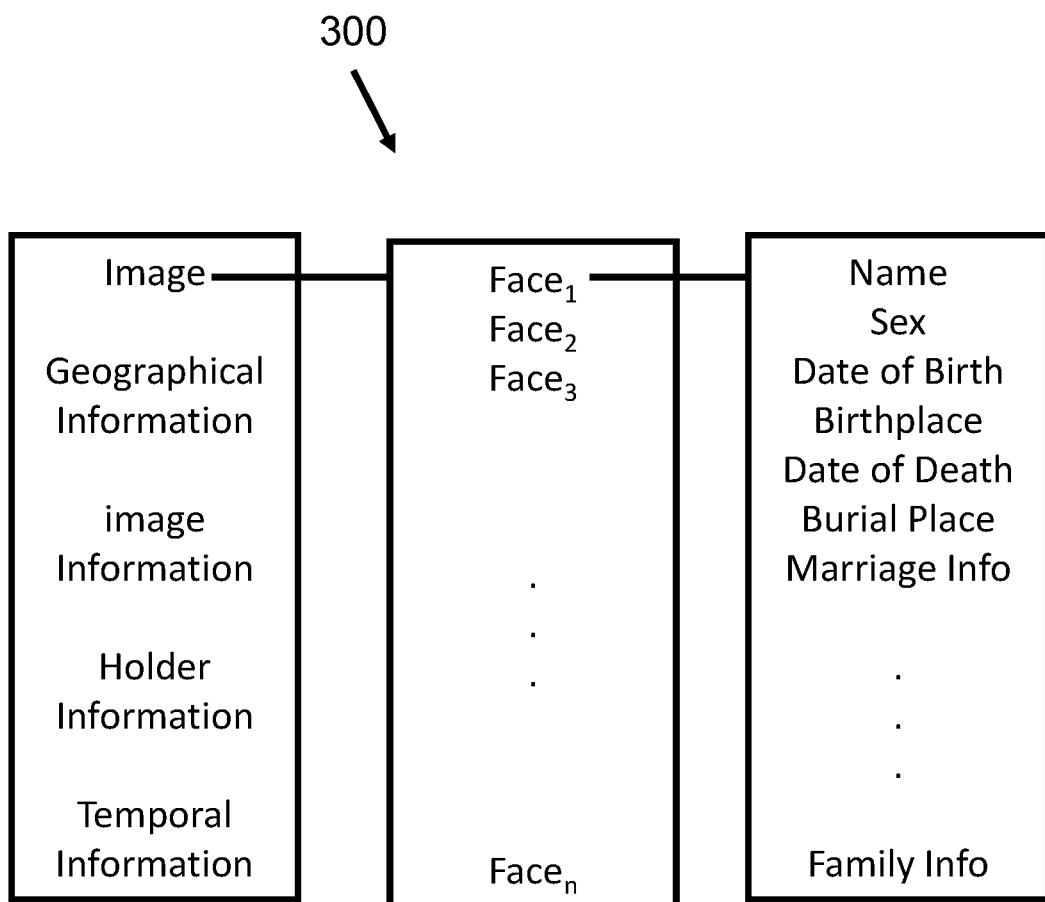
FIG. 3 is metadata saved in a notification system in accordance with aspects of the present disclosure.

Referring to FIG. 3, a database 300 may be built by the relationship unit 150 based on one image. The top level is the image and includes geolocation information and image information, which are saved in the metadata section of the image or may be added by the holder of the image. The top level also includes holder information of the holder of the image, which includes the name, contact information, and a notification flag.

The next related level includes all faces, $face_1$-$face_n$, captured in the image and recognized by the face recognition unit 140. Each face may be a representative face of the same faces in the image. Each face is related to personal information of the face. The personal information is information specific to the face, including the name, sex, data of birth, birthplace, data of death, burial place, marriage information, family information, and the like.

After processing all the images uploaded by the user, the relationship unit 150 may combine databases of each image. For example, faces of each image may be combined. For example, when the same face is found in two or more database of images uploaded by the user, the relationship unit 150 may select a global representative among the same faces, which are representative faces in two or more databases, and merge the metadata of the same faces into one global database with the global representative face. In other words, when the user has added metadata and face information of one face, the user does not have to add face information for the following same faces. In a case where metadata of two images, which include a same face, are different, only the face information of two databases may be merged.

In another case where the face information of a face in one database is different from the face information of the face in another database, the metadata processing unit 130 may show a notification indicating inconsistencies between the face information of the same faces, and show a user interface to address such inconsistencies. The user then corrects the inconsistency so that the relationship unit 150 may be able to update the face information of one global representative face to have correct information. After combining all databases, the relationship unit 150 may build one global database for each user.

Now referring back to FIG. 1, the image depository 110 further includes a face matching unit 160 and a notification unit 170. After processing all images from all users, the face matching unit 160 may compare recognized faces of images of one user with those of another user. In other words, the face matching unit 160 compares the global database of one user with the global database of another user. Particularly, the face matching unit 160 may compare global representative faces in the global database of one user with global representative faces in the global database of another user. Hereinafter, without losing general context, "representative face(s)" will be used for "global representative face(s)".

In an aspect, representative faces may be standardized so that they have substantially the same facial size and/or substantially similar brightness. The face matching unit 160 may also utilize machine learning systems and machine learning algorithms by reinforcing weights in comparing faces or representative faces. In another aspect, the machine learning systems and machine learning algorithms may be trained via a supervised or unsupervised manner. For example, previously obtained faces may be provided with annotations and train the machine learning system and machine learning algorithms by reinforcing weights. The machine learning systems may include, but are not limited to, neural networks, deep neural networks, recurrent neural networks (RNN), deep learning through neural networks, generative adversarial networks (GAN), Bayesian Regression, Naive Bayes, Monte Carlo Methods, nearest neighbors, least squares, means, and support vector regression, long short-term memory (LSTM), among other data science, artificial intelligence, and machine learning techniques.

In a further aspect, the face matching unit 160 may compare global representative faces in the global database after performing the age match by performing morphological processing to faces at different ages so that the ages of two faces are matched or at least to be similar to each other.

Since not every image of faces is exactly the same, when a difference between two representative faces is smaller than a first threshold value, the face matching unit 160 may determine that the two representative faces are same. When the difference is greater than the first threshold value but less than a second threshold, which is larger than the first threshold value, the face matching unit 160 may determine that the two faces are very similar but may not be able to determine that they are same. In this case, the face matching unit 160 may also compare metadata related to each face. In particular, the face matching unit 160 compares personal information (e.g., person's name, sex, parents' names, siblings' names, date of birth, birthplace, spouse's name, names of children, date of death, burial place, etc.) of one representative face with that of the other representative face. When the personal information matches to each other, the face matching unit 160 may determine that the representative faces match, and consider the representative faces to be of the same person. In an aspect, the face matching unit 160 may compare not every piece of but a portion of the metadata, for example, the person's name or birthday. In this regard, the face matching unit 160 may prioritize the metadata and metadata having a higher priority may have a higher weight in comparing than metadata having a lower priority. When the metadata with higher priority matches with each other, the face matching unit 160 is likely to determine that the representative faces are same. That means both users have a same friend, family member, or acquaintance.

When the difference is greater than the second threshold value, the two faces are considered different from each other. The face matching unit 160 then moves to the next representative face of each user for face comparison.

When two faces of two users are determined as matching, the notification unit 170 may send a notification to both users about the matched faces. As the holder information in the database may have a user's permission for notification, two users may be notified when both users permit such a notification. When there is no permission by one user, the face matching unit 160 may not be able to notify the user even if the global database of the user has a same face as in the global database of another user.

Figure 4:
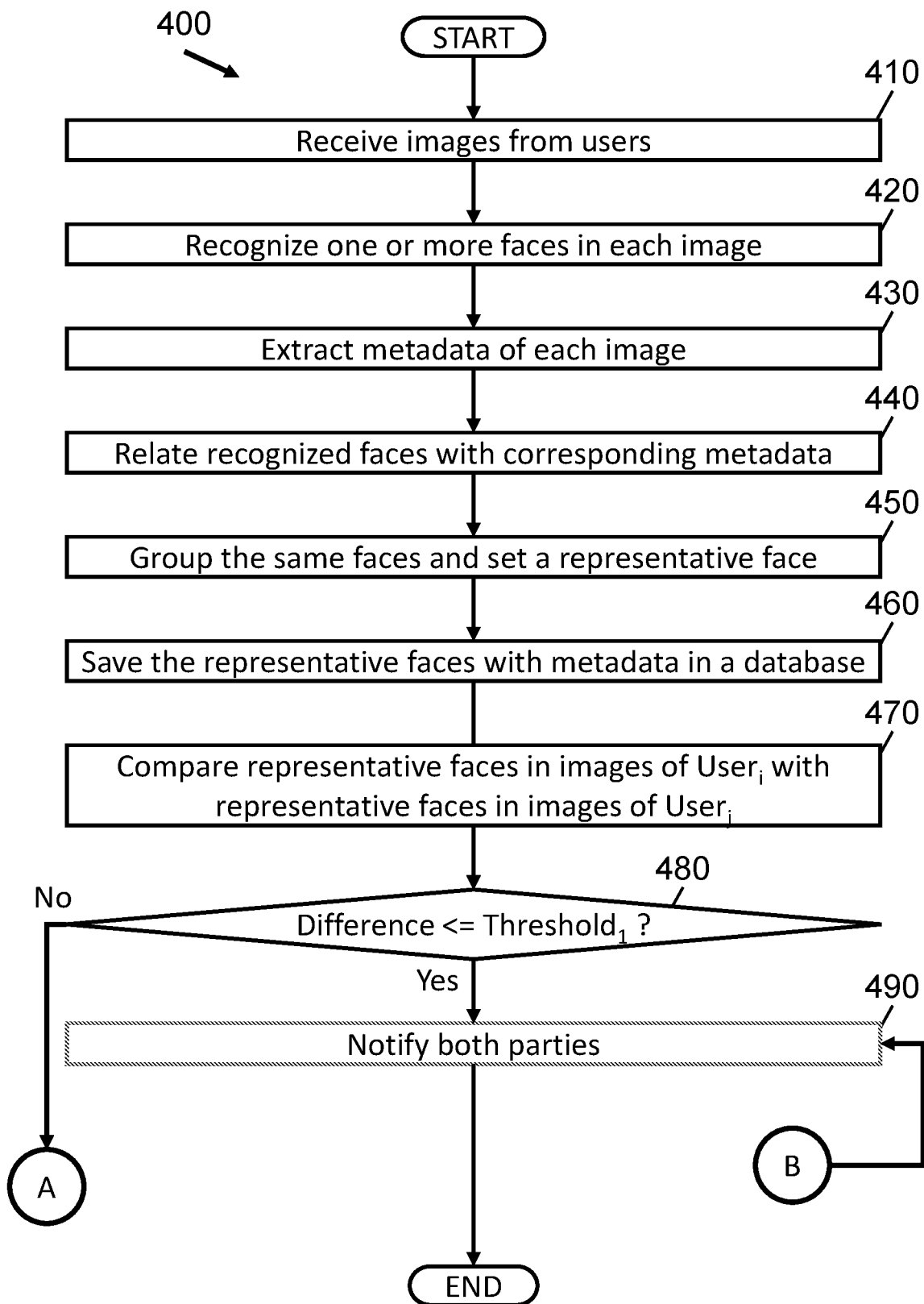
FIGS. 4 and 5 are flowcharts of a notification method in accordance with aspects of the present disclosure.

FIG. 4 is a flowchart of a notification method 400 when a face captured in an image of one user matches a face captured in an image of another user in accordance with aspects of the present disclosure. In step 410 of the notification method 400, users upload and an image depository of a notification system receives digital images, which includes an image section and a metadata section (e.g., 210 and 220 of FIG. 2).

In step 420, one or more faces in the image section of each uploaded image are recognized. Prior to this recognition of faces, the uploaded images may be pre-processed so that pre-processed images may have substantially the same facial size and/or substantially similar brightness.

In step 430, from the metadata section, metadata of each uploaded image is extracted. The metadata may include geolocation information of the place where the image was captured and setting information such as aperture, shutter speed, ISO number, focal depth, and dots per inch (DPI). In an aspect, additional information may be added to the metadata in a case where the metadata section does not include such information or the metadata needs updates.

Further, in step 430, face information may be added to each recognized face in each image. Since the metadata in the metadata section of each image does not provide sufficient information about the recognized faces, users may be requested to enter information of the recognized faces. The face information may include a name, sex, parents' names, siblings' names, date of birth, birthplace, spouse's name, names of children, date of death, burial place of each recognized face, etc.

The recognized faces and the corresponding metadata and face information are related to each other and the relationship may be saved in a database in step 440. The database may be saved for each user and the user's database includes all faces captured in all images uploaded by the user.

When there are same faces in the user's database, the same faces are grouped together and a representative face for the same faces may be selected in step 450. That is entries of the same faces are combined into one entry of the representative face in the user's database in step 460. Particularly, the face information of the same faces may be merged for face information of the representative face. The representative face may show a whole face substantially facing forward. Further, entries of the face information of the same faces other than the representative face may be removed from the user's database and images of the other same faces may be saved under the representative face in the user's database. After the grouping in step 450, the final version of the user's database may be saved with the metadata and face information in step 460.

By repeatedly performing steps 410-460 for each user, a database for each user may be built without redundancy in representative faces.

In step 470, each representative face (or a first face) in the database of one user, $User_i$ (or a first user) are compared with each representative face (or a second face) in the database of another user, $User_j$ (or a second user). In an aspect, a difference between features of the first face and features of the second face is calculated.

It is determined whether or not the difference is less than or equal to a first threshold in step 480. The first threshold may be pre-determined for same faces. If the difference is less than the first threshold, the first face and the second face may be considered to be same. In this case, both users may be notified of the same face in step 490.

In an aspect, the database includes notification permission information. By setting the notification permission off, the user is not bothered by a notification when a certain face stored in the user's database matches a face stored in another user's database. Further, by setting the notification permission off, the user may be able not to send a notification to the other user for one or more faces saved in the user's database.

Figure 5:
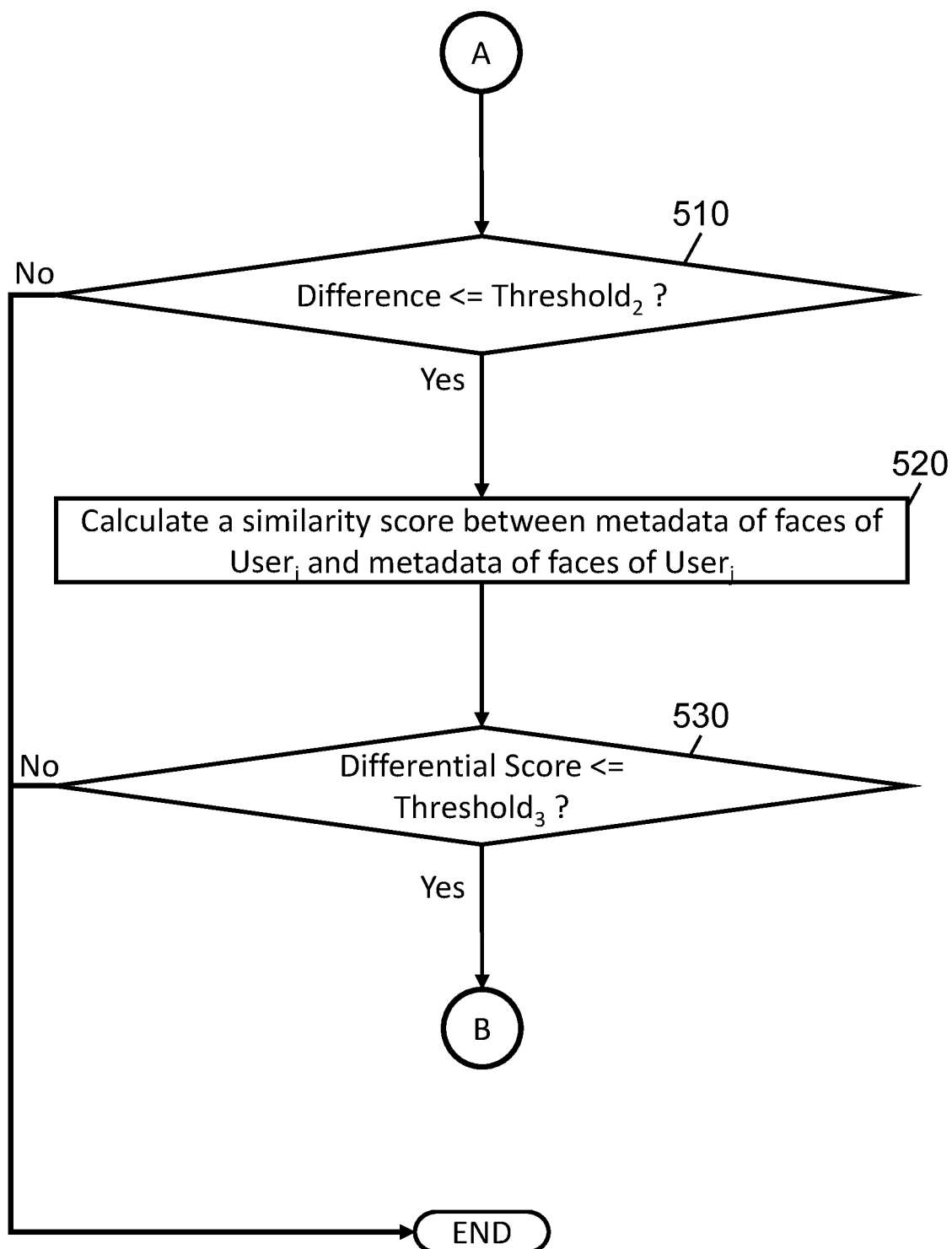

When it is determined that the difference is not greater than the first threshold in step 480, steps 510-530 of FIG. 5 are performed to check whether the first representative face is similar to the second representative face. In step 510, it is determined whether or not the difference is less than or equal to a second threshold, which is greater than the first threshold. The second threshold may be pre-determined for determining similar faces.

In a case where it is determined that the difference is not less than or equal to the second threshold, the first representative face is considered different from the second representative face and the notification method 400 end in comparing the first and second representative faces. Otherwise, in step 520, a differential score between metadata of the first representative face and metadata of the second representative face is calculated. The metadata may include the geolocation and the personal information of the representative face. In an aspect, the differential score may be calculated with different priority or weights for items in the personal information. For example, the name and the hometown may have a higher weight than a marriage or death date.

When calculating an individual differential score for each item, the individual differential score may be a difference between the items. For example, "Smith" and "Smithson" are different but similar. Likewise, "Robinson" and "Robison" are different but similar. Further, the difference between "Smith" and "Smithson" may be larger than the difference between "Robinson" and "Robison." With respect to dates, the individual differential score may be a difference between two dates. The individual differential score may be multiplied by a respective weight and all individual differential scores are added to obtain the differential score.

In step 530, the differential score is compared with a third threshold. In a case where it is determined that the differential score is less than or equal to the third threshold, the first and second representative faces are considered the same and corresponding both users are notified in step 490. If not, the first and second representative faces are considered different and the notification method 400 ends in comparing the first and second representative faces.

By performing steps 410-490 and 510-530, the notification method 400 compares the first representative face of a first user and the second representative face of the second user. The notification method 400 is further performed so that every representative face of the first user is compared with every representative face of the second user. Furthermore, the notification method 400 is also performed between every possible two users of all users. In this way, any pair of users who owns images having a same face is notified by the notification method 400.

Figure 6:
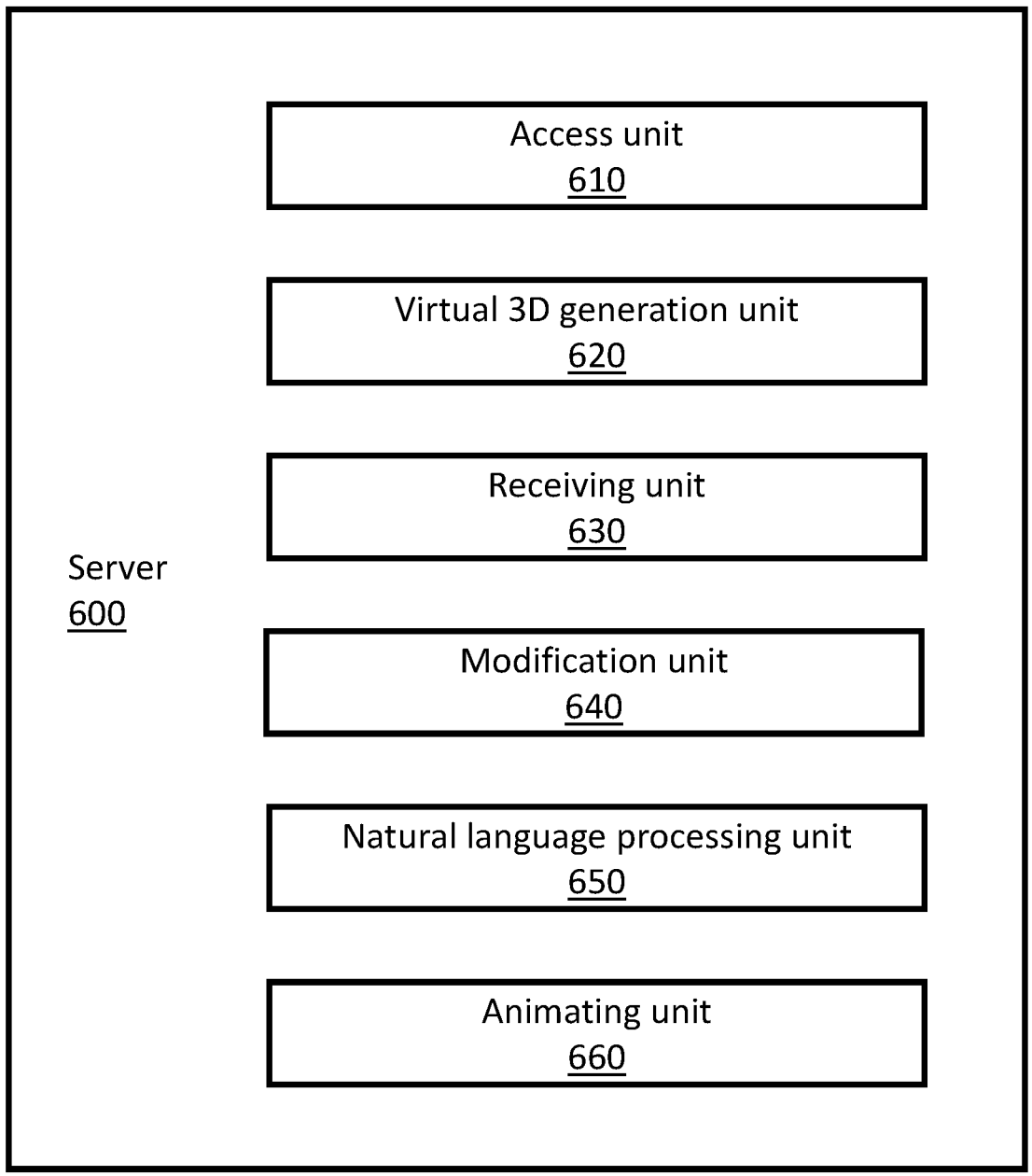
FIG. 6 is a block diagram for a virtual reality system in accordance with aspects of the present disclosure.

With reference to FIG. 6, a virtual reality system (VRS) 600 for creating a virtual three-dimensional (3D) representation of an image is provided. The VRS 600 may enable a user to input an image into the VRS 600, detect at least one object in an image and generate a virtual 3D representation of the at least one object in the image, which the user may interact with or view via any virtual 3D display device known by those of ordinary skill in the art. The VRS 600 includes an access unit 610, a virtual 3D generation unit 620, a receiving unit 630, a modification unit 640, a natural language processing (NPL) unit 650, and an animating unit 660.

The access unit 610 may access a first image from a database that is input into the database by a user via a user's device (e.g., via the user device 170-1 of FIG. 1). In aspects, the access unit 610 may access a second image related to the first image. Each of the first image and second image may include metadata that the access unit 610 can process to determine if the first image and the second image are related. For example, where the metadata of the first image indicates the place where the first image was captured and the metadata of the second image also indicates the same place, the access unit 610 may verify that the first and second images are related. Also, in a configuration that the first image may depict an exterior of a building and the second image may depict at least a portion of the interior of the building, the access unit 610 verifies that the images relate to the same house.

The virtual 3D generation unit 620 may perform image processing on the first image to detect one or more objects depicted in the first image and to generate a virtual 3D representation of the one or more objects. The one or more objects may be at least one of an environment (e.g., a house, a mountain, a lake, a boat, a street, etc.), a person, an animal, or an item (e.g., a couch, a lamp, a book, a shovel). The virtual 3D generation unit 620 may generate a 3D mesh of the object and generate a plurality of features of the 3D mesh.

Alternatively, the virtual 3D generation unit 620 may use tessellation to develop a virtual 3D representation of the object. The plurality of features of the object include dimensions, colors, textures, or the like, and identify and catalog each feature or object. For example, a feature may be cataloged as a wall that is 7 feet high with geometric print wallpaper. The virtual 3D generation unit 620 catalogs the features such that each feature can be selected or identified by a user or the modification unit 640 may further refine the virtual 3D representation. In another example, where an image depicts a playground, the virtual 3D generation unit 620 is able to identify and catalog a swing, a slide, or a climbing obstacle. In aspects, the first or second images may depict an environment, a person, an animal, or an item that is imaginary. For example, the first image may depict a scene from a movie or stage play that has a set and/or that is animated, and the virtual 3D generation unit renders a virtual 3D representation of the imaginary environment, person, animal, or item.

The virtual 3D generation unit 620 may include an artificial intelligence module that processes the image to generate the 3D mesh or tessellation of the object. The virtual 3D generation unit 620 may utilize machine learning algorithms, computer vision, convolutional neural networks, or the like, to process the image and/or to generate the 3D mesh or tessellation of the object. The artificial intelligence module is further configured to detect at least one of edges, nodes, or faces of the object depicted in the image. The edges, nodes, or faces may be used to map and generate the 3D mesh or tessellation of the object. The artificial intelligence module, machine learning, computer vision, or the like, may predict the missing edges, nodes, or faces of the object that are not depicted in the image. For example, if the image depicts a front of a couch, the artificial intelligence module determines edges, nodes, and/or faces, and other characteristics, including color, dimensions, texture, etc., of the couch, and makes a determination as to how the couch would appear if viewed from another perspective (e.g., from behind). The virtual 3D generation unit 620 then generates additional edges, nodes, or faces of the object to complete the virtual 3D representation of the object.

The virtual 3D generation unit 620 may have been trained with a training set or a database of images of objects with a variety of views. The training set may teach the artificial intelligence model to predict and refine how each object should be rendered in a virtual 3D representation. For example, the training set may include a set of images of different tables with corresponding virtual 3D representations of each of the different tables such that the virtual 3D generation unit 620 may predict how a table depicted in the first image may appear in the virtual 3D representation.

In an aspect, the virtual 3D generation unit 620 may generate the 3D mesh or tessellation from a plurality of images, which depict the same area. For example, one image shows a living room, another image shows a kitchen, and the other image shows a house where the living room and kitchen are. The artificial intelligence module may integrate them together to generate a 3D representation of the house by filling the gap, which is not shown in the images.

In another aspect, the virtual 3D generation unit 620 may be configured to generate a 3D representation from a movie clip, such as Casablanca or Godfather, and integrate the 3D representation into the environment shown in an image. The source of the 3D representation is not limited to images and movie clips but can be extended to any other viable real or virtual objects.

In a further aspect, the virtual 3D generation unit 620 may incorporate or link to historical facts. For example, if a building was broken during the World War II, the virtual 3D generation unit 620 may incorporate the fact to the building so that the generated VR building can be seen broken, even though the VR building is shown intact before the World War II. Or, the historical facts may be linked to the VR building so that, when a user's mouse comes over the VR building, a window is popped up with description of the building along passage of time during the World War II. The historical facts may include a specific time period, a geographical area, and any other information.

In a still further aspect, the virtual 3D generation unit 620 may access the geographical and time information in the metadata of the image, and generate the VR space by linking the historical facts to the objects in the VR space based on the geographical and time information in the corresponding metadata as described above.

In a still further aspect, the virtual 3D generation unit 620 may integrate a personal VR, which has been personally generated by a user and is private to the user, into the VR space. For example, when a user has generated a building (e.g., a house, playground, school, mountain, etc.) and a character (e.g., a person) in a personal VR space, and wants to add the personal VR space to the VR space, the virtual 3D generation unit 620 may integrate the personal VR space at a proper position. When the personal VR space is integrated, the status of the integrated personal VR space may become public so that every user may access the integrated personal VR space.

In aspects, the user may be able to set the integrated portion of the personal VR space into the VR space to be private so that other users may be able to access the integrated personal VR space only upon reception of an invitation to the integrated personal VR space.

Just in a case where there is a conflict between the VR space and the personal VR space, meaning that the personal VR space and the corresponding portion in the VR space are different from each other or do not correspond to each other, the virtual 3D generation unit 620 may request the user to address the conflict.

The receiving unit 630 enables a user to provide a command to modify the virtual 3D representation. The command may be a voice command. The receiving unit 630 may include an audio input device or microphone for sensing the voice command. The VRS 600 is thus able to receive a user's command to modify the virtual 3D representation and to enable the user device to display the modified virtual 3D representation according to the command. The NLP unit 650 may parse the voice command and apply a natural language processing algorithm to the parsed voice command to identify a feature of the plurality of features of the virtual 3D representation expressed in the voice command.

The modification unit 640 modifies the feature in accordance with the identified features. The modification unit 640 may modify the virtual 3D representation in near real-time according to the command.

Returning to the previous example of the playground, the user may command vocally that "the swing is black with green chains the slide is taller and metallic." The NLP unit 650 parses the voice command into sentences, such as: "The swing is black with green chains. The slide is taller and metallic." The modification unit 640 then identifies the swing in the virtual 3D representation and modifies the features of the swing so that it is black with green chains. The modification unit 640 also modifies the virtual 3D representation of the slide so that the slide is taller and has a metallic appearance.

The voice command may include a command to add a new feature or object to the virtual 3D representation. Returning again to the previous example of the playground, the voice command may include an expression to "add a bench flanked on the sides by flowers opposite the slide." The NLP unit 650 processes the voice command and identifies the object and instructions, i.e., to "add a bench" "flanked on the sides (of the bench) by flowers" that is to be placed "opposite the slide." The modification unit 640 then modifies the virtual 3D representation to include a bench flanked on the side by flowers opposite the bench. In this manner, a user may arrange, modify, or add objects or features and thus better approximate what the image depicts as a 3D virtual representation.

In aspects, the command may include a command to modify the virtual 3D representation by processing a second image related to the first image. The virtual 3D generation unit 620 then analyzes the second image and identifies the objects or features depicted in both the first and second images, and renders the virtual 3D representation to incorporate the additional features, including additional edges, nodes, or faces of the one or more objects. The virtual 3D generation unit 620 thus identifies a difference between the second image and the first image and modifies the virtual 3D representation in light of the difference detected. The virtual 3D generation unit 620 modifies the first image to include the difference where the difference between the second image and the first image provides further details of the one or more objects or features from the first image, overriding any prior estimation or prediction of the appearance of the one or more objects or features. The virtual 3D generation unit 620 may interpolate between the first image and the second image to arrive at a refined prediction of the appearance of the one or more objects and modify the 3D mesh of the virtual 3D representation as needed.

For example, a user may input an image that depicts the user's grandmother sitting in the grandmother's living room of the grandmother's house, and the VRS 600 generates a virtual 3D representation of the grandmother and the living room as depicted in the image. The VRS 600 enables the user to further modify and refine the virtual 3D representation as desired, for example, by inputting a command to process an image of a kitchen of the grandmother's house that was open to the living room. The virtual 3D generation unit 620 then renders the virtual 3D representation such that a virtual model of the grandmother's house includes the living room and the kitchen. In this manner, the virtual 3D representation may be further refined, extended, enlarged, or developed with further VR structures. In this manner, a building, structure, object, or environment may be approximately generated as the virtual 3D representation.

The user may provide a voice command to increase a virtual length of a sofa in the living room represented in the virtual 3D representation. The modification unit 640 then modifies the sofa in accordance with the command.

The VRS 600 may include an animating unit 660 configured to animate virtual 3D representations of humans or animals. The animating unit 660 may animate the human of the virtual 3D representation to speak or move in the virtual 3D representation. The animating unit 660 may utilize an artificial intelligence chatbot configured to converse with a user in the virtual 3D representation. In the prior example, the animating unit 660 animates the grandmother to move about the living room or to converse with the user in the virtual 3D representation via the artificial intelligence chatbot.

The user may modify a virtual voice or sound of the artificial intelligence chatbot using the modification unit 640. The user may input an audio recording related to the voice or sound of the virtual 3D representation object. For example, the user may input an audio recording of the user's grandmother speaking. The modification unit 640 then renders the virtual voice such that the animating unit 660 can approximate the grandmother's voice via the artificial intelligence chatbot.

By repeatedly modifying the virtual 3D representation either via commands, voice commands, additional images, or voice recordings, the user is able to approximate a memory of the one or more objects depicted in the image.

The VRS 600 may transmit the virtual 3D representation to a user device so that the user may view the virtual 3D representation on the display device of the user device. A rendering unit (e.g., a graphic processing unit, a processor, or a combination of both) of the user device may render the virtual 3D representation for display on the display device.

The VRS 600 may also include a face recognition unit (e.g., the face recognition unit 140 of FIG. 1) configured to recognize one or more faces in the first image and a face matching unit (e.g., the face matching unit 160 of FIG. 1) configured to check whether the face in the first image matches a face in a second image input into the database by a second user. The VRS 600 may also include a metadata processing unit (e.g., the metadata processing unit 130 of FIG. 1) configured to process metadata in each accessed image. The VRS 600 may include a notification unit (e.g., the notification unit 170 of FIG. 1) configured to notify a first user and a second user associated with the first and second images in a case where the face in the first image matches the face in the second image. In this way, the first user and the second user may view the virtual 3D representation of the first image. The first and second users may then each be able to modify the virtual 3D representation by providing commands to the VRS 600.

Advantageously, this may allow lost relatives, friends, or connections (e.g., old friends, family friends, business partners, etc.) to reconnect if a first user and a second user each input an image of another relative, friend, or connection (e.g., a great grandparent). They may each be able to experience the virtual 3D representation of the image and further modify the virtual 3D representation using their images and/or memories related to the virtual 3D representation.

Figure 7:
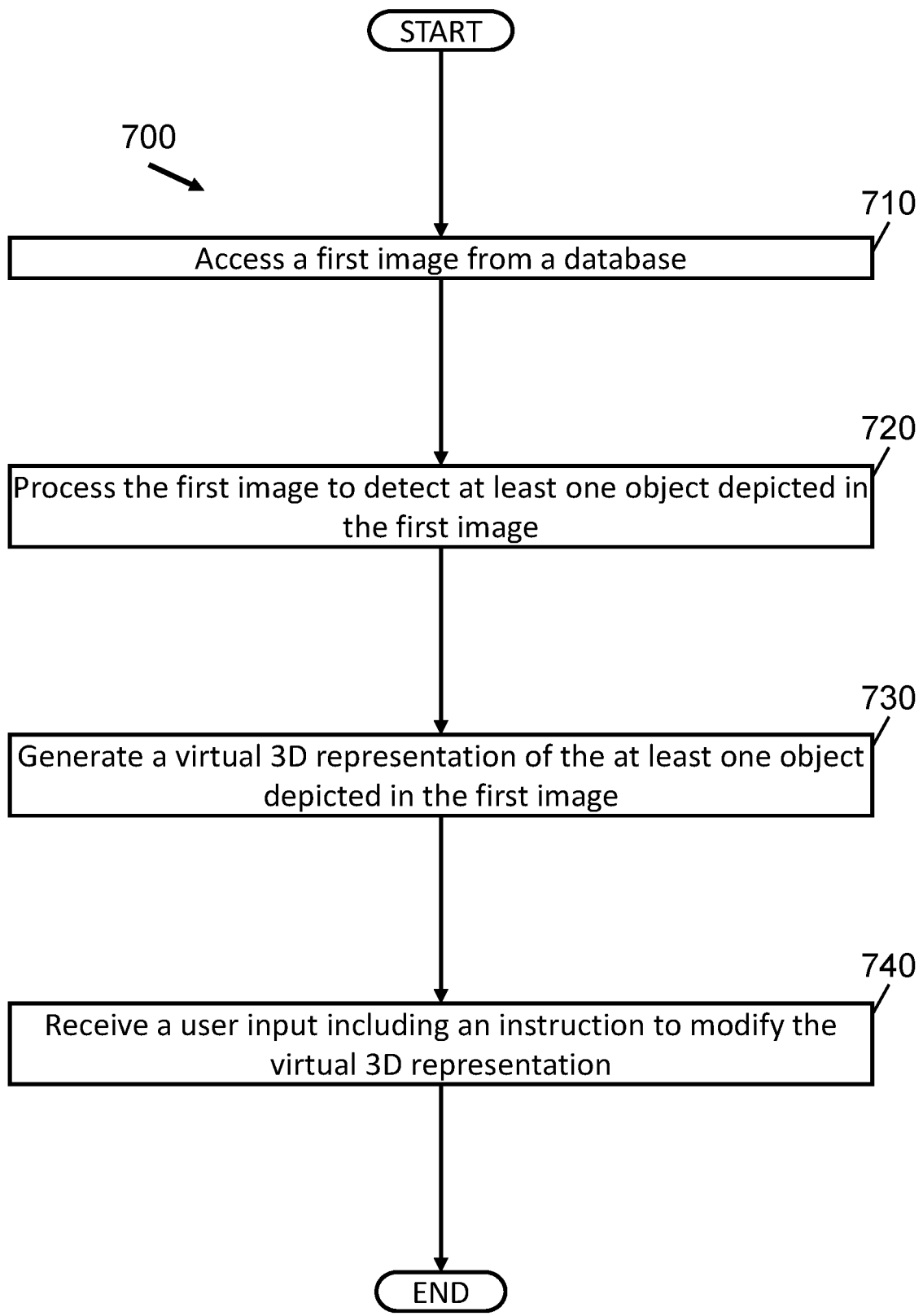
FIGS. 7-9 are flowcharts of a method for generating a virtual three-dimensional representation in accordance with aspects of this disclosure.
Figure 8:
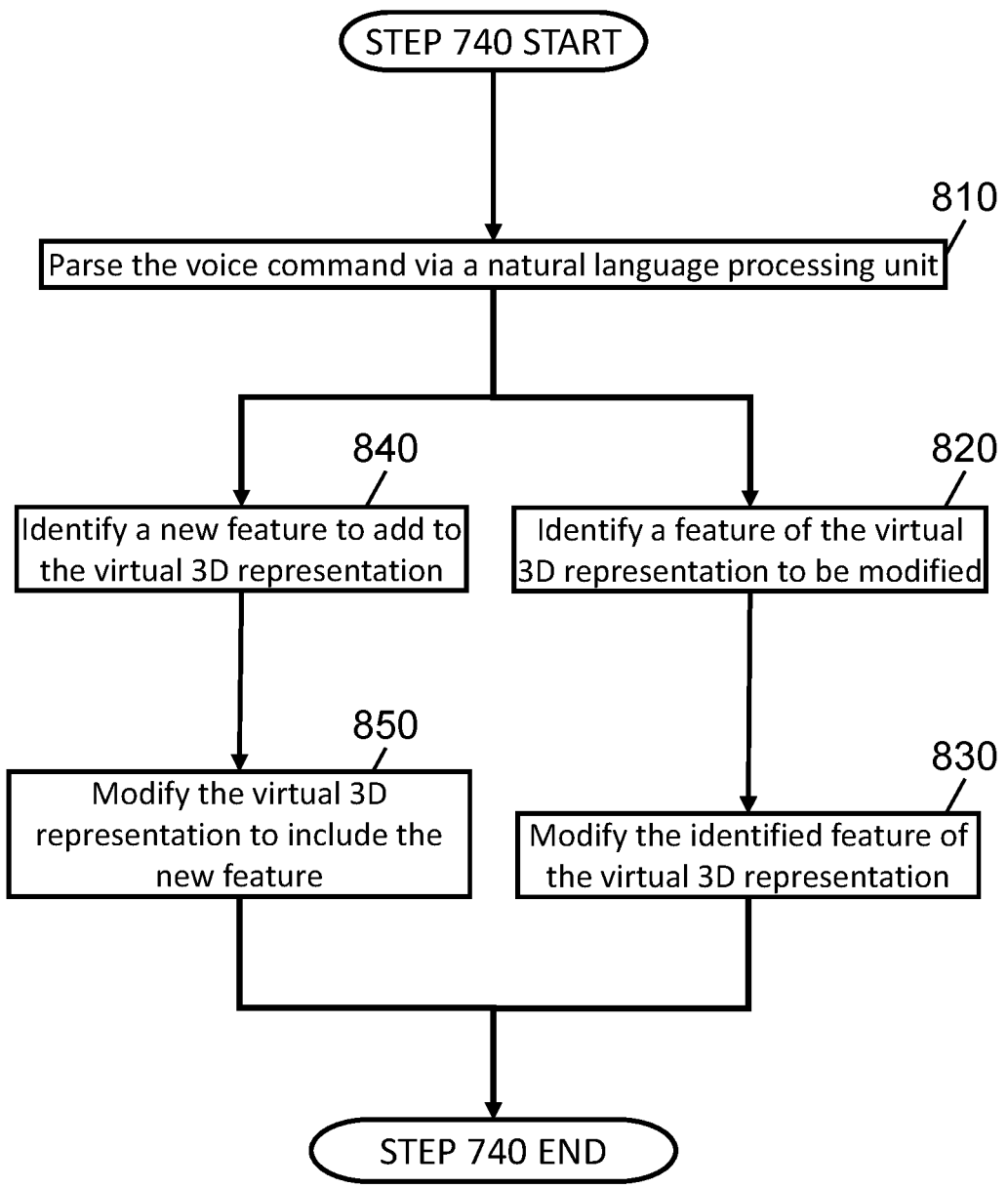
Figure 9:
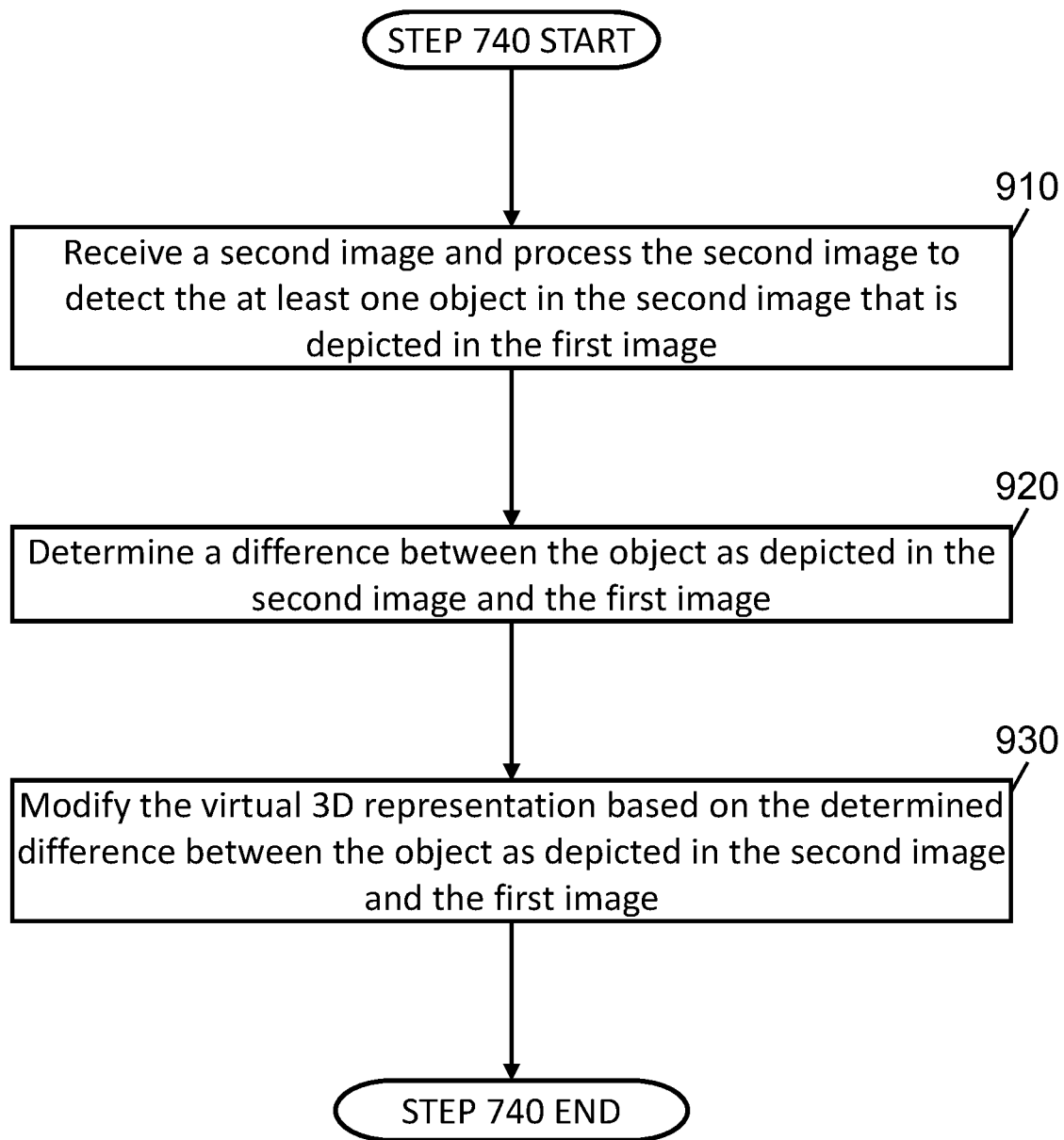

With reference to FIGS. 7-9, there is shown a flowchart of an exemplary computer implement method 700 for generating a virtual 3D representation of an image in accordance with aspects of this disclosure. Although the operations of the method 700 of FIGS. 7-9 are shown in a particular order, the operations need not all be performed in the specified order, and certain operations can be performed in another order. For simplicity, the method 700 will be described below with the VRS 600 performing the operations. However, in various aspects, the operations of FIGS. 7-9 may be performed in part by the VRS 600 and in part by any other suitable computing device. These variations are contemplated to be within the scope of the present disclosure.

Initially, at step 710, a VRS accesses a first image from a database. At step 720, the VRS processes the first image to detect at least one object depicted in the first image. At step 730, the VRS generates a virtual 3D representation of the at least one object depicted in the first image. At step 740, the VRS receives a user input including an instruction or command to modify the virtual 3D representation.

Figure 10:
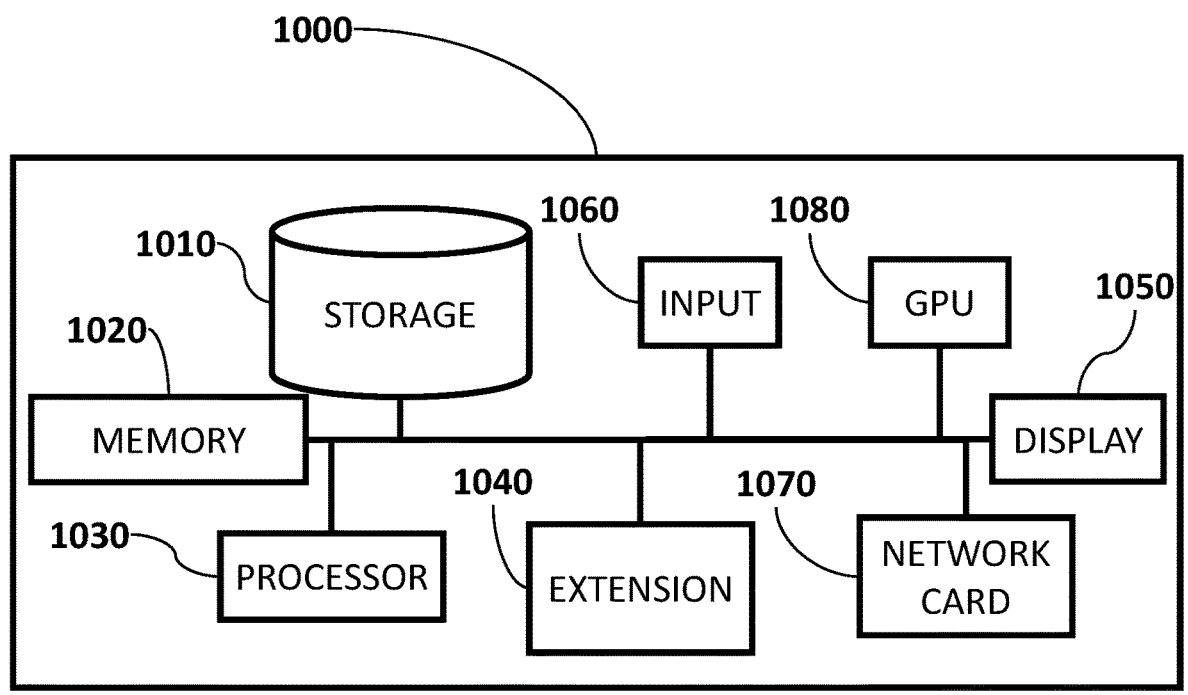
FIG. 10 is a block diagram of a computing device in accordance with aspects of the present disclosure.

Step 740 may include one or more of the following sub-steps as illustrated in FIGS. 9 and 10. At step 810, the VRS parses the voice command. At step 820, the VRS identifies a feature or object of the virtual 3D representation to be modified as expressed in the parsed voice command. At step 830, the VRS modifies the identified feature or object of the virtual 3D representation. At step 840, the VRS identifies a new feature or object to add to the virtual 3D representation expressed in the parsed voice command. At step 850, the VRS modifies the virtual 3D representation to include the new feature or object expressed in the parsed voice command.

Step 740 may be performed by processing steps in FIG. 9. At step 910, the VRS receives a second image and processes the second image to detect the at least one object in the second image that is depicted in the first image. At step 920, The VRS determines a difference between the object depicted in the second image and the first image. At step 930, the VRS modifies the virtual 3D representation based on the determined difference between the object as depicted in the second image and the first image.

The method 700 may further include some of the steps of the notification method 400 of FIG. 4 for identifying faces in a first image and a second image. The method 700 may include displaying the virtual 3D representation to a plurality of users. The method 700 may include animating a human or animal in the virtual 3D representation. The method 700 may include causing a human of the virtual 3D representation to converse with a user via an artificial intelligence chatbot.

FIG. 10 is a block diagram for a computing device 1000 representative of the notification server 100 of FIG. 1 or the VRS 600 of FIG. 6 in accordance with embodiments of the present disclosure. The computing device 1000 may include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, embedded computers, and autonomous vehicles. Those of skill in the art will recognize that many smartphones are suitable for use in the system described herein. Suitable tablet computers include those with booklet, slate, and convertible configurations, known to those of skill in the art.

In some embodiments, the computing device 1000 includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the computing device 1000 may include a storage 1010. The storage 1010 is one or more physical apparatus used to store data or programs on a temporary or permanent basis. In some embodiments, the storage 1010 may be volatile memory and requires power to maintain stored information. In some embodiments, the storage 1010 may be non-volatile memory and retains stored information when the computing device 1000 is not powered. In some embodiments, the non-volatile memory includes flash memory. In some embodiments, the non-volatile memory includes dynamic random-access memory (DRAM). In some embodiments, the non-volatile memory includes ferroelectric random-access memory (FRAM). In some embodiments, the non-volatile memory includes phase-change random access memory (PRAM). In some embodiments, the storage 1010 includes, by way of non-limiting examples, CD-ROMs, DVDs, flash memory devices, magnetic disk drives, magnetic tapes drives, optical disk drives, and cloud computing-based storage. In some embodiments, the storage 1010 may be a combination of devices such as those disclosed herein.

The computing device 1000 further includes a processor 1030, an extension 1040, a display 1050, an input device 1060, and a network card 1070. The processor 1030 is a brain to the computing device 1000. The processor 1030 executes instructions which implement tasks or functions of programs. When a user executes a program, the processor 1030 reads the program stored in the storage 1010, loads the program on the RAM, and executes instructions prescribed by the program.

The processor 1030 may include a microprocessor, central processing unit (CPU), application specific integrated circuit (ASIC), arithmetic coprocessor, graphic processor, or image processor, each of which is electronic circuitry within a computer that carries out instructions of a computer program by performing the basic arithmetic, logical, control and input/output (I/O) operations specified by the instructions.

In embodiments, the extension 1040 may include several ports, such as one or more universal serial buses (USBs), IEEE 1394 ports, parallel ports, and/or expansion slots such as peripheral component interconnect (PCI) and PCI express (PCIe). The extension 1040 is not limited to the list but may include other slots or ports that can be used for appropriate purposes. The extension 1040 may be used to install hardware or add additional functionalities to a computer that may facilitate the purposes of the computer. For example, a USB port can be used for adding additional storage to the computer and/or an IEEE 1394 may be used for receiving moving/still image data.

In some embodiments, the display 1050 may be a cathode ray tube (CRT), a liquid crystal display (LCD), or light emitting diode (LED). In some embodiments, the display 1050 may be a thin film transistor liquid crystal display (TFT-LCD). In some embodiments, the display 1050 may be an organic light emitting diode (OLED) display. In various some embodiments, the OLED display is a passive-matrix OLED (PMOLED) or active-matrix OLED (AMOLED) display. In some embodiments, the display 1050 may be a plasma display. In some embodiments, the display 1050 may be a video projector. In some embodiments, the display may be interactive (e.g., having a touch screen or a sensor such as a camera, a 3D sensor, a LiDAR, a radar, etc.) that can detect user interactions/gestures/responses and the like.

In still some embodiments, the display 1050 is a combination of devices such as those disclosed herein.

A user may input and/or modify data via the input device 1060 that may include a keyboard, a mouse, or any other device with which the use may input data. The display 1050 displays data on a screen of the display 1050. The display 1050 may be a touch screen so that the display 1050 can be used as an input device.

The network card 1070 is used to communicate with other computing devices, wirelessly or via a wired connection. Through the network card 1070, digital images may be received from user devices and notifications of face match may be transmitted to the user devices.

The computing device 1000 may further include a graphics processing unit (GPU) 1080, which generally accelerate graphics rendering. Since the GPU 1080 is able to parallelly process many pieces of data simultaneously, the GPU 1080 may be also used for machine learning systems and AI algorithms. The GPU 1080 may cooperate with the processor 1030 to enhance machine learning or AI algorithms for recognizing faces, objects, and backgrounds in images and generating and modifying virtual 3D representations.

Any of the herein described methods, programs, algorithms, or codes may be converted to, or expressed in, a programming language or computer program. The terms "programming language" and "computer program," as used herein, include any language used to specify instructions to a computer, and include (but not limited to) the following languages and their derivatives: Assembler, Basic, Batch files, BCPL, C, C+, C++, C#, Delphi, Fortran, Java, JavaScript, machine code, operating system command languages, Pascal, Perl, PL1, scripting languages, Visual Basic, meta-languages which themselves specify programs, and all first, second, third, fourth, fifth, or further generation computer languages. Also included are database, other data schemas, and any other meta-languages. No distinction is made between languages which are interpreted or compiled. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), GPUs, or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, the above-described servers and computing devices.

What is claimed:

1. A virtual reality system for creating a virtual three-dimensional (3D) representation of an image, the virtual reality system comprising:
a processor; and
a memory coupled to the processor and storing one or more instructions, which, when executed by the processor, cause the virtual reality system to:
access a first image from a database, the first image input into the database by a user;
perform image processing on the first image to detect at least one object depicted in the first image and to generate a virtual 3D representation of the at least one object;
generate a 3D mesh of the at least one object;
detect, using machine learning, at least two of edges, nodes, or faces of the at least one object to generate a plurality of features of the 3D mesh;
receive, via a user interface, a command for modification; and
modify the virtual 3D representation based on the command.

2. The virtual reality system of claim 1, wherein the command includes an audio command.

3. The virtual reality system of claim 2, wherein the instructions, when executed by the processor, further cause the virtual reality system to:
parse the audio command to identify a feature of the plurality of features of the virtual 3D representation expressed in the audio command,
wherein the identified feature of the plurality of features of the virtual 3D representation is modified according to the audio command.

4. The virtual reality system of claim 3, wherein the audio command is for identifying a new object or feature, and
wherein the new feature or object expressed in the audio command is added to the virtual 3D representation.

5. The virtual reality system of claim 3, wherein the instructions, when executed by the processor, further cause the virtual reality system to:
when the at least one object includes a human, animate the human to speak or move in the virtual 3D representation.

6. The virtual reality system of claim 1, wherein the instructions, when executed by the processor, further cause the virtual reality system to:
access a second image from the database, the second image input into the database by another user and related to the first image; and
process the second image to detect at least one object depicted in the second image and determine at least one difference depicted in the second image between the at least one object in the first image and the second image,
wherein the virtual 3D representation of the at least one object is modified based on the at least one difference.

7. The virtual reality system of claim 1, wherein the instructions, when executed by the processor, further cause the virtual reality system to:
detect, using artificial intelligence, at least one of a color, a dimension, or a texture of the at least one object to generate a second plurality of features of the 3D mesh.

8. The virtual reality system of claim 1, wherein the instructions, when executed by the processor, further cause the virtual reality system to:
predict, using artificial intelligence, at least one of missing edges, nodes, or faces of the at least one object omitted from the first image.

9. A method for creating a virtual three-dimensional (3D) representation of an image, the method comprising:
accessing a first image from a database, the first image input into the database by a user;
processing the first image to detect at least one object depicted in the first image;
generating a virtual 3D representation of the at least one object;
generating a 3D mesh of the at least one object;
detecting, using machine learning, at least two of edges, nodes, or faces of the at least one object to generate a plurality of features of the 3D mesh;
receiving, via a user interface, a command to modify the virtual 3D representation; and
modifying the virtual 3D representation based on the command.

10. The method of claim 9, wherein the command includes an audio command, and wherein the method further comprises:
parsing the audio command to identify a feature of the plurality of features of the virtual 3D representation or to identify a new feature to be added to the virtual 3D representation expressed in the audio command,
wherein modifying the virtual 3D representation includes modifying the identified feature of the plurality of features of the virtual 3D representation or adding the new feature to the virtual 3D representation according to the audio command.

11. The method claim 10, further comprising:
when the at least one object includes a human, animating the human to speak or move in the virtual 3D representation.

12. The method claim 10, further comprising:
accessing a second image from the database, the second image input into the database by the user and related to the first image; and
processing the second image to detect at least one object depicted in the first image and determine a difference between the at least one object in the first image and the second image,
wherein the virtual 3D representation of the at least one object is modified based on the difference.

13. The method of claim 9, further comprising:
detecting, using artificial intelligence, at least one of a color, a dimension, or a texture of the at least one object to generate a second plurality of features of the 3D mesh.

14. The method of claim 9, further comprising:
predicting, using artificial intelligence, at least one of missing edges, nodes, or faces of the at least one object omitted from the first image.

15. A non-transitory computer readable storage medium including instructions that, when executed by a computer, cause the computer to perform a method for creating a virtual three-dimensional (3D) representation of an image, the method comprising:
accessing a first image from a database, the first image input into the database by a user;
processing the first image to detect at least one object depicted in the first image;
generating a virtual 3D representation of the at least one object;
generating a 3D mesh of the at least one object;
detecting, using artificial intelligence, at least two of edges, nodes, or faces of the at least one object to generate a plurality of features of the 3D mesh;

receiving, via a user interface, a command to modify the virtual 3D representation; and modifying the virtual 3D representation based on the command.

16. The medium of claim 15, wherein the command includes an audio command, and wherein the method further comprises:

parsing the audio command to identify a feature of the plurality of features of the virtual 3D representation or to identify a new feature to be added to the virtual 3D representation expressed in the audio command, wherein modifying the virtual 3D representation includes modifying the identified feature of the plurality of features of the virtual 3D representation or adding the new feature to the virtual 3D representation according to the audio command.

17. The medium of claim 16, wherein the method further comprises:

when the at least one object includes a human, animating the human to speak or move in the virtual 3D representation.

18. The medium of claim 16, wherein the method further comprises:

accessing a second image from the database, the second image input into the database by the user and related to the first image; and processing the second image to detect at least one object depicted in the first image and determine a difference between the at least one object in the first image and the second image, wherein the virtual 3D representation of the at least one object is modified based on the difference.

19. The medium of claim 15, wherein the method further comprises:

detecting, using artificial intelligence, at least one of a color, a dimension, or a texture of the at least one object to generate a plurality of features of the 3D mesh.

20. The medium of claim 15, wherein the method further comprises:

predicting, using artificial intelligence, at least one of missing edges, nodes, or faces of the at least one object omitted from the first image.

* * * * *